(12) United States Patent
Okamoto (10) Patent No.: US 10,418,070 B2
(45) Date of Patent: Sep. 17, 2019

(54) DISK DEVICE WITH SEALING SUBSTRATE THAT COVERS THROUGH HOLE OF HOUSING

(71) Applicants: KABUSHIKI KAISHA TOSHIBA, Tokyo (JP); Toshiba Electronic Devices & Storage Corporation, Tokyo (JP)

(72) Inventor: Makoto Okamoto, Kodaira Tokyo (JP)

(73) Assignees: KABUSHIKI KAISHA TOSHIBA, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/893,421

(22) Filed: Feb. 9, 2018

(65) Prior Publication Data

US 2019/0074615 A1  Mar. 7, 2019

(30) Foreign Application Priority Data

Sep. 5, 2017 (JP) ................................. 2017-170549

(51) Int. Cl.
| | |
|---|---|
| G11B 33/00 | (2006.01) |
| G11B 5/012 | (2006.01) |
| G11B 33/12 | (2006.01) |
| H01R 12/71 | (2011.01) |
| G11B 23/00 | (2006.01) |

(52) U.S. Cl.
CPC ............ *G11B 33/122* (2013.01); *G11B 5/012* (2013.01); *G11B 23/00* (2013.01); *G11B 33/00* (2013.01); *H01R 12/716* (2013.01)

(58) Field of Classification Search
None
See application file for complete search history.

(56) References Cited

U.S. PATENT DOCUMENTS

| | | | | |
|---|---|---|---|---|
| 5,508,860 A | * | 4/1996 | Takagi et al. ........ | G11B 33/122 360/99.25 |
| 5,872,680 A | | 2/1999 | Patterson et al. | |
| 7,137,196 B2 | | 11/2006 | Gunderson et al. | |
| 7,876,527 B2 | * | 1/2011 | Nakamiya et al. .. | G11B 33/122 360/97.22 |

(Continued)

FOREIGN PATENT DOCUMENTS

| | | |
|---|---|---|
| JP | 2001-184835 A | 7/2001 |
| JP | 2016-126991 A | 7/2016 |

*Primary Examiner* — Craig A. Renner
(74) *Attorney, Agent, or Firm* — Kim & Stewart LLP (57) ABSTRACT

A disk device includes a housing that includes a base with a through hole formed therein and a cover fixed to the base, wherein the housing contains a low density gas; a plurality of heads and a wiring member disposed within the housing that includes conductors that are electrically connected to the heads; a sealing substrate that is fixed to the base and covers the through hole; a control circuit board that is disposed outside the housing and adjacent to a back surface of the base; a first two-piece connector that is disposed within the housing and connects the sealing substrate and the wiring member; and a second two-piece connector that connects the sealing substrate and the control circuit board. The second two-piece connector includes a first connector mounted on the sealing substrate and a second connector that is mounted on the control circuit board.

17 Claims, 7 Drawing Sheets

(56) References Cited

U.S. PATENT DOCUMENTS

| | | | |
|---|---|---|---|
| 9,196,303 B2* | 11/2015 | Hirano et al. | G11B 33/122 |
| 9,230,598 B1* | 1/2016 | Bernett et al. | G11B 33/122 |
| 9,734,874 B1* | 8/2017 | Choe et al. | G11B 33/122 |
| 9,886,985 B1* | 2/2018 | Okamoto et al. | G11B 33/122 |
| 2009/0034113 A1 | 2/2009 | Hashi et al. | |
| 2011/0056731 A1* | 3/2011 | VandenEynden et al. | H01B 17/305 174/152 GM |

* cited by examiner

DISK DEVICE WITH SEALING SUBSTRATE THAT COVERS THROUGH HOLE OF HOUSING

CROSS-REFERENCE TO RELATED APPLICATION

This application is based upon and claims the benefit of priority from Japanese Patent Application No. 2017-170549, filed Sep. 5, 2017, the entire contents of which are incorporated herein by reference.

FIELD

Embodiments described herein relate generally to a disk device.

BACKGROUND

As a disk device, a magnetic disk drive includes a housing having a base and a top cover, a rotatable magnetic disk and an actuator for supporting a magnetic head is disposed in the housing. As a method of improving performance of the disk drive, a low density gas such as helium is filled in the housing to reduce the rotational resistance of the magnetic disk and the magnetic head.

In such a magnetic disk drive, the top cover is laser-welded to the base of the housing, so that an enclosed housing is formed with an airtight seal. This laser welding is performed along the entire outer periphery of the top cover. In order to transmit an electric signal of the magnetic head disposed in the housing to the control circuit board disposed outside the device, a connector penetrates the bottom wall of the housing. In a magnetic disk drive filled with a low-density gas, it is preferable to use a hermetic connector as the connector to maintain the airtightness inside the housing.

DESCRIPTION OF THE DRAWINGS

FIG. 8 is a cross-sectional view illustrating a state in which a second two-piece connector of the connector unit of FIG. 5 is separated; and.

DETAILED DESCRIPTION

Embodiments provide a disk device in which a height of a connector connection portion can be reduced while airtightness of a housing is maintained.

In general, according to one embodiment, a disk device includes: a housing that includes a base with a through hole formed therein and a cover fixed to the base, wherein the housing contains a gas having a lower density than air; a plurality of rotatable magnetic disks that are disposed within the housing; a plurality of heads that write information on and read information from the magnetic disks; a wiring member disposed within the housing that includes conductors that are electrically connected to the heads; a sealing substrate that is fixed to the base and covers the through hole; a control circuit board that is disposed outside the housing and adjacent to aback surface of the base; a first two-piece connector that is disposed within the housing and connects the sealing substrate and the wiring member; and a second two-piece connector that connects the sealing substrate and the control circuit board, wherein the second two-piece connector includes a first connector mounted on the sealing substrate and a second connector that is mounted on the control circuit board and is configured to mate with the first connector.

With reference to the drawings, disk devices according to various embodiments will be described.

Note that the disclosure is merely an example, and any modification and variation which can be easily conceived by a person ordinarily skilled in the art without departing from the spirit of the embodiments naturally falls within the scope of the present invention. To further clarify explanation, for example, the width, thickness or shape of each structure may be schematically shown in the drawings compared with the actual structures, and are not necessarily to scale. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

Hard disk drives (HDDs) according to various embodiments will be described in detail below, and referred to herein as "disk devices."

First Embodiment

Figure 1:
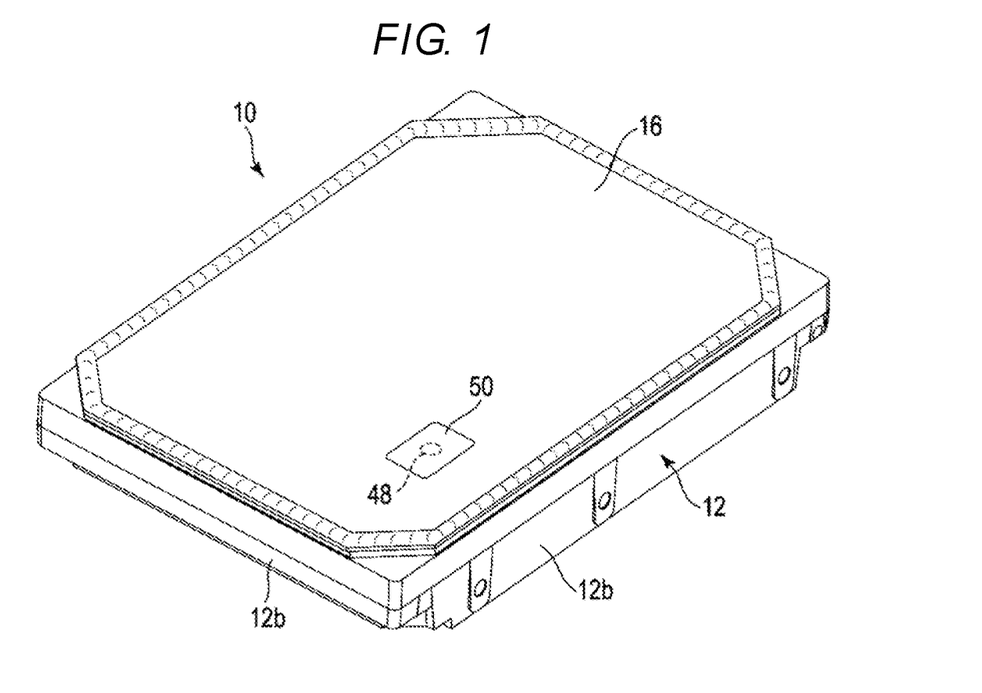
FIG. 1 is a perspective view illustrating the exterior of a hard disk drive (HDD) according to a first embodiment.
Figure 2:
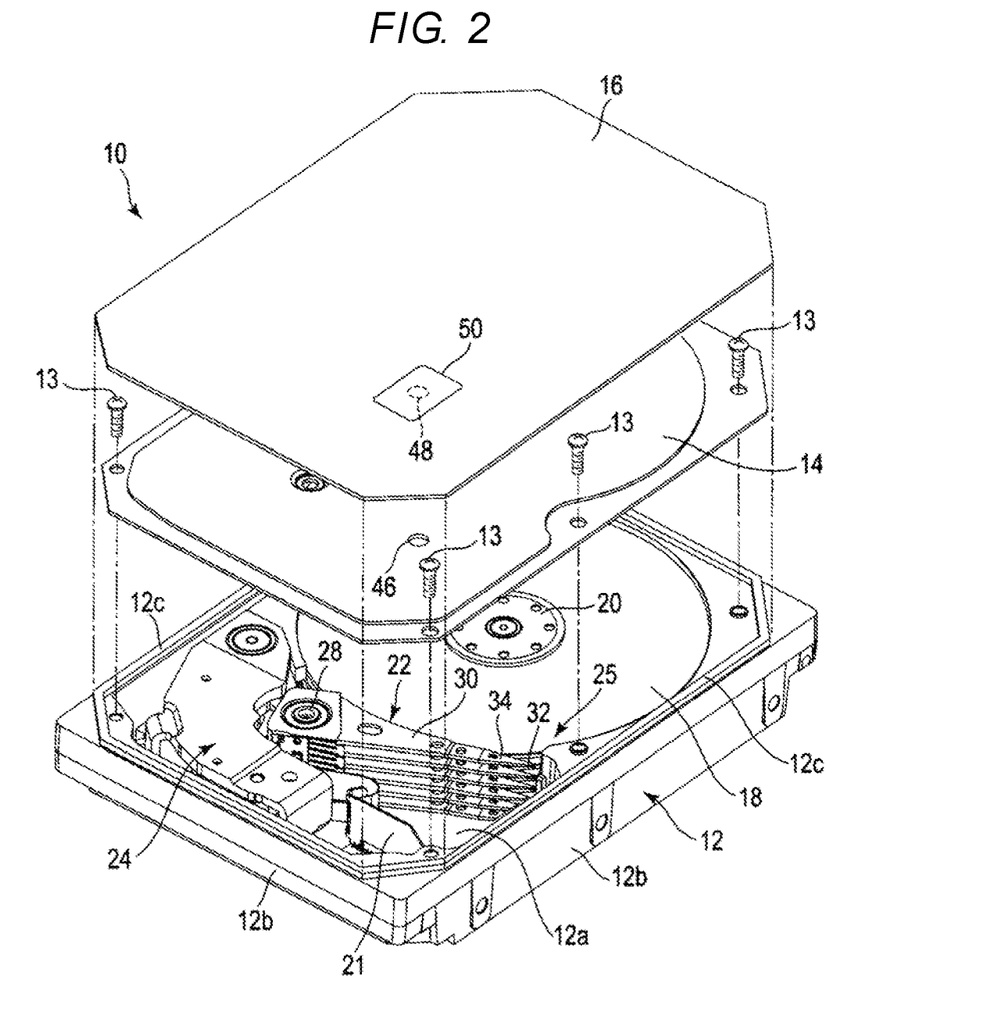
FIG. 2 is an exploded perspective view of the HDD of FIG. 1 according to the first embodiment.

FIG. 1 is a perspective view illustrating the exterior of an HDD according to a first embodiment, and FIG. 2 is an exploded perspective view of the HDD of FIG. 1 illustrating an internal structure of the HDD.

As illustrated in FIGS. 1 and 2, the HDD includes a substantially rectangular housing 10. The housing 10 includes a rectangular box-shaped base 12 with an opened upper surface, an inner cover 14 that is screwed to the base 12 by a plurality of screws 13 and closes an upper end opening of the base 12, and an outer cover (top cover) 16 that is positioned so as to overlap with the inner cover 14 and has a peripheral edge welded to the base 12. The base 12 includes a rectangular bottom wall 12a facing the inner cover 14 with a gap therebetween and sidewalls 12b disposed along a peripheral edge of the bottom wall 12a. The base 12 is, for example molded from aluminum ingot. The sidewalls 12b include a pair of elongated-side walls facing each other and a pair of shorter-side walls that are shorter than the elongated side walls and respectively face a corresponding elongated side wall. A fixing rib 12c having substantially a rectangular shape in cross-section protrudes from an upper end surface of the sidewalls 12b as shown.

The inner cover 14 is formed of, for example, stainless steel, and has a rectangular plate shape. A peripheral edge of the inner cover 14 is screwed to an upper surface of the sidewalls 12b of the base 12 by the screws 13, and the inner cover 14 is fixed to an inner side of the fixing rib 12c. The outer cover 16 is formed of, for example, aluminum, and has a rectangular plate shape. The outer cover 16 is substantially planar and is formed to extend slightly that the edges of the inner cover 14. A peripheral edge of the outer cover 16 is welded and fixed in an airtight fashion to the fixing rib 12c of the base 12 along the entire periphery of the base 12.

Vent holes 46 and 48 are formed in the inner cover 14 and the outer cover 16, respectively, so that the inside and the outside of the housing 10 are in fluidly couple to each other. Air in the housing 10 is exhausted through the vent holes 46 and 48, and a low density gas (typically an inert gas), having a lower density than air (for example, helium) is filled in the housing 10 through the vent holes 46 and 48. A seal (sealing body) 50 is attached to an outer surface of the outer cover 16 to close the vent hole 48.

As illustrated in FIG. 2, disposed within the housing 10 are a plurality of recording media, for example, five to nine magnetic disks 18, and a spindle motor 20 serving as a driving unit for supporting and rotating the magnetic disks 18. The spindle motor 20 is disposed on the bottom wall 12a. Each of the magnetic disks 18 is formed to have, for example, a diameter of 95 mm (3.5 inches) and has a magnetic recording layer on a upper surface and/or lower surface thereof. The magnetic disks 18 are coaxially aligned with each other on a hub (not illustrated) of the spindle motor 20, and are clamped by a clamp spring and fixed to the hub. Thus, each of the magnetic disks 18 is supported to be parallel to the bottom wall 12a of the base 12. The magnetic disks 18 are rotated by the spindle motor 20 at a predetermined rotational speed.

In the embodiment as illustrated in FIG. 2, five to nine magnetic disks 18 are accommodated in the housing 10, but any number of the magnetic disks 18 may be used. In addition, a single magnetic disk 18 may be accommodated in the housing 10.

Also disposed within the housing 10 is a plurality of magnetic heads 32 that records and reproduces information on the magnetic disks 18, and a head stack assembly (actuator) 22 that movably supports these magnetic heads 32 against the magnetic disks 18. Further, the housing 10 encloses a voice coil motor 24 (hereinafter, referred to as "VCM") that rotates and positions the head stack assembly 22, a ramp loading mechanism 25 that holds the magnetic head 32 at an unloading position away from the magnetic disk 18 when the magnetic head 32 moves to the outermost periphery of the magnetic disk 18, and a board unit (wiring member) 21. The board unit 21 is formed of a flexible printed wiring circuit board (FPC). The FPC is electrically connected to the magnetic head 32 and a voice coil of the VCM 24 via a relay FPC provided on the head stack assembly 22. According to various embodiments, an electronic component such as a conversion connector (third connector) 62a is fixed to or mounted on the board unit 21 and is electrically connected thereto.

The head stack assembly 22 includes a rotatable bearing unit 28, a plurality of arms 30 extending from the bearing unit 28, and suspensions 34 extending from the respective arms 30. Each of the magnetic heads 32 is supported at a tip end of a respective suspension 34.

A control circuit board 54 (which will be described below) is screwed to the outer surface of the bottom wall 12a of the base 12. The control circuit board 54 controls the operation of the spindle motor 20 and controls the operation of the VCM 24 and the magnetic head 32 via the board unit 21.

Figure 3:
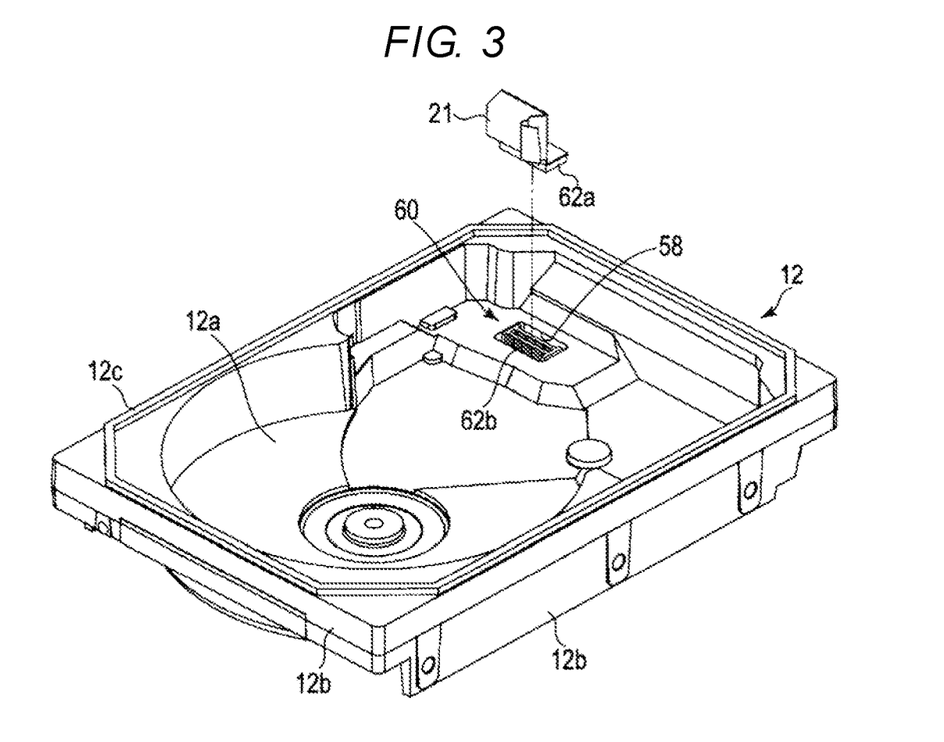
FIG. 3 is a perspective view illustrating a base of a housing of the HDD.
Figure 4:
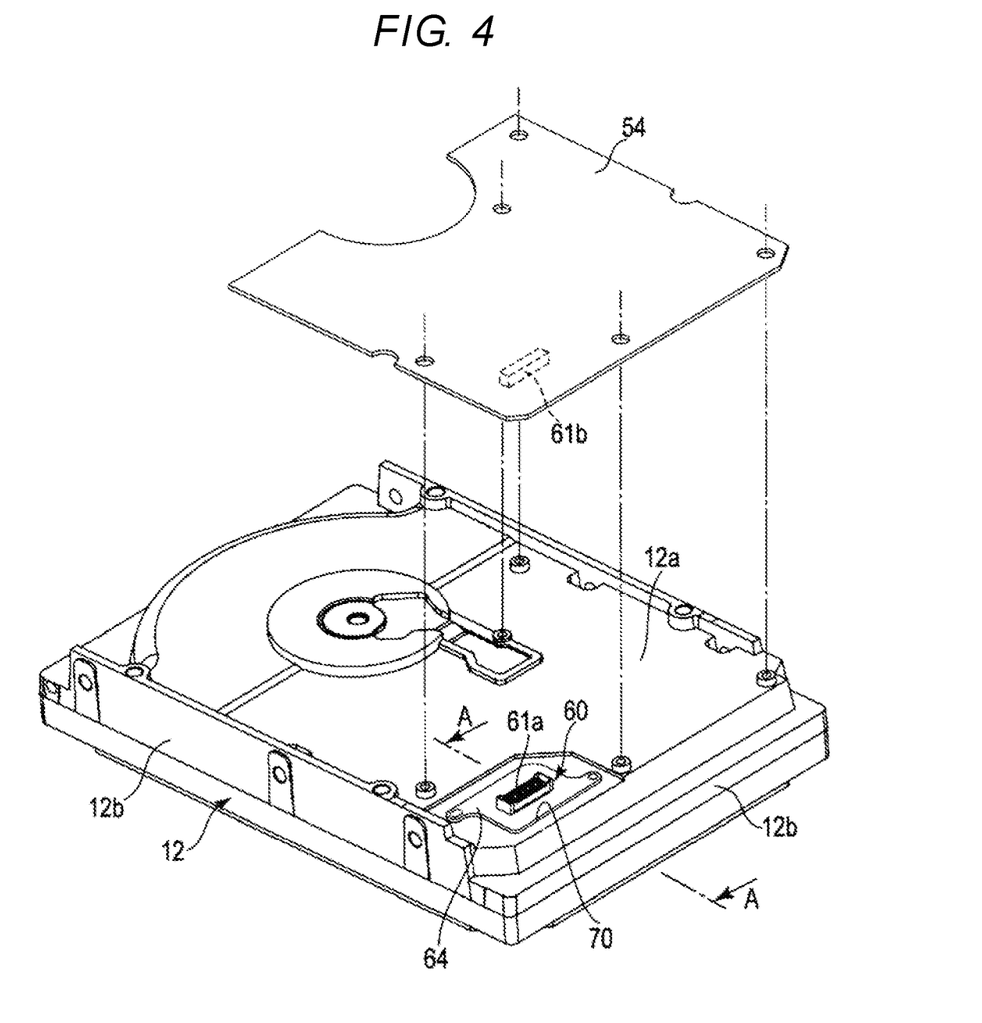
FIG. 4 is an exploded perspective view illustrating a back side of the base in FIG. 3 and a control circuit board.
Figure 5:
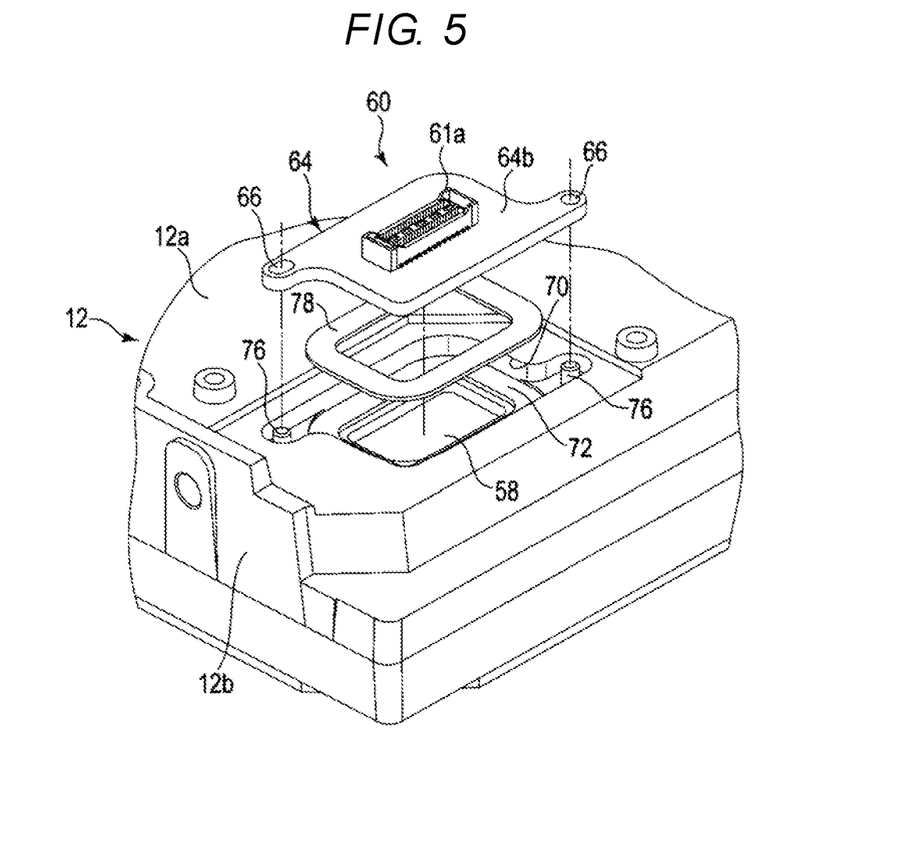
FIG. 5 is an exploded perspective view illustrating a connector mounting portion of the base in FIG. 3 and a connector unit.
Figure 6:
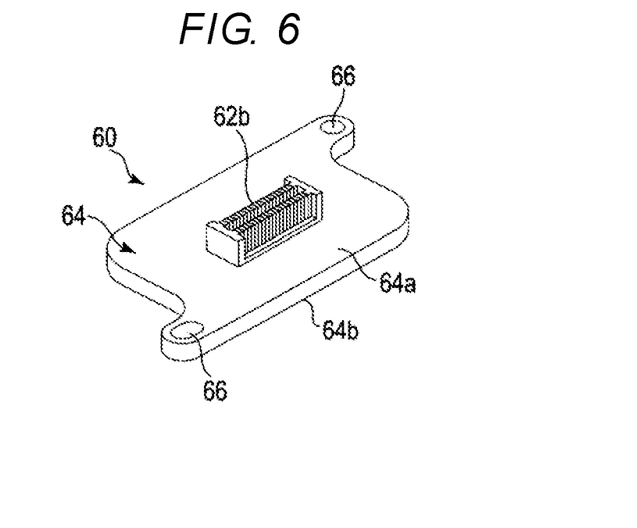
FIG. 6 is a perspective view illustrating a first principal surface of the connector unit in FIG. 5.
Figure 7:
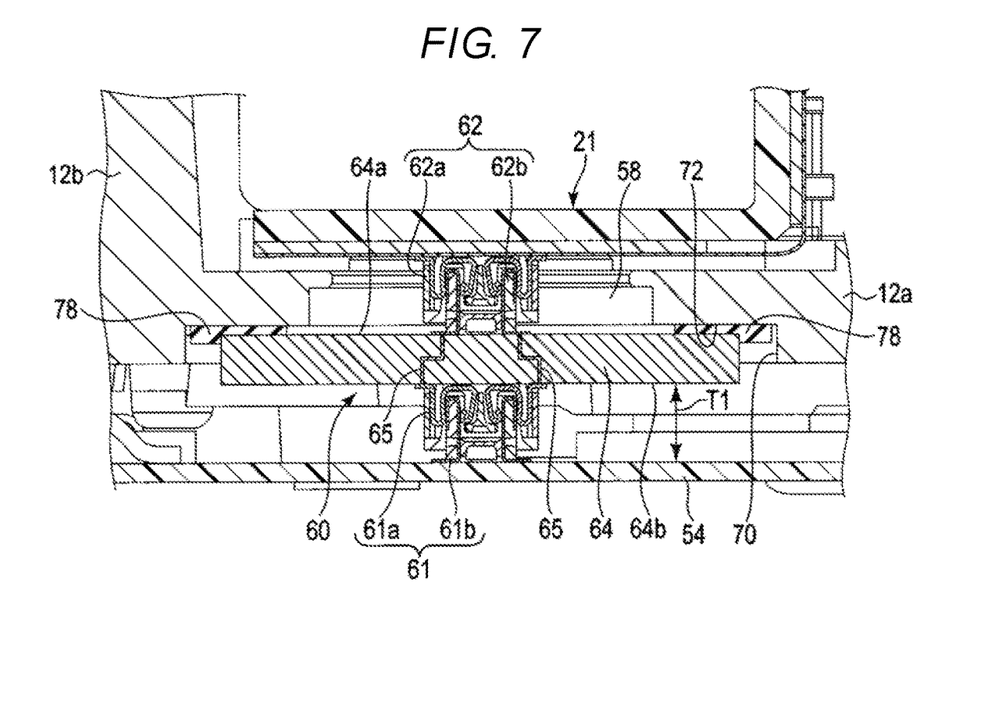
FIG. 7 is a cross-sectional view of the connector mounting portion and the connector unit of FIG. 5 taken along line A-A in FIG. 4.

FIG. 3 is a perspective view illustrating the base of the housing in which certain elements of the HDD are removed, FIG. 4 is a perspective view illustrating a back side of the housing and the control circuit board, FIG. 5 is an exploded perspective view illustrating the connector mounting portion of the base and a connector unit, FIG. 6 is a perspective view illustrating an inner side of the connector unit, and FIG. 7 is a cross-sectional view of the connector mounting portion and the connector unit taken along line A-A in FIG. 4.

As illustrated in FIGS. 3 and 4, for example, a rectangular through hole (penetration hole) 58 is formed at one end of the bottom wall 12a of the base 12 proximate one of the shorter-side walls. The through hole 58 is an opening from the inner surface to the outer surface (back surface) of the bottom wall 12a. A fourth connector 62b of a connector unit 60 is fitted and inserted into the through hole 58.

As illustrated in FIGS. 5 and 7, a fitting recess 70 having substantially a rectangular shape is formed in a region that includes the through hole 58 on the back surface (outer surface) of the bottom wall 12a. A bottom surface of the fitting recess 70 includes an installation surface 72 positioned around the through hole 58. In the embodiment illustrated, installation surface 72 of the fitting recess 70 is parallel to the outer surface of the bottom wall 12a. Positioning pins 76 are respectively disposed proximate two diagonally opposing corners of the installation surface 72. Each positioning pin 76 has a protruding height substantially equal to a depth of the fitting recess 70. The two positioning pins 76 can be molded integrally with the bottom wall 12a of the base 12. A plating layer, for example, a nickel plating layer, may be formed on the installation surface 72.

As illustrated in FIGS. 5, 6, and 7, the connector unit 60 includes a sealing substrate 64, fourth connector 62b, and a first connector 61a. The fourth connector 62b and the first connector 61a are mounted on the sealing substrate 64. The sealing substrate 64 is formed with a substantially rectangular shape that corresponds to the fitting recess 70 of the base 12, where the rectangular shape of the sealing substrate is slightly smaller in width and length than the fitting recess 70. A thickness of the sealing substrate 64 is slightly greater than the depth of the fitting recess 70. Conversely, the fitting recess 70 is formed to be shallower than the thickness of the sealing substrate 64. The sealing substrate 64 is configured with, for example, a multilayer circuit board that is formed by stacking multiple printed circuit boards. The sealing substrate 64 has a first primary surface 64a and a second primary surface 64b opposite to the first primary surface 64a, the first primary surface 64a and the second primary surface 64b being flat.

The fourth connector 62b is mounted substantially at the center of the first primary surface 64a. The first connector 61a is mounted substantially at the center of the second primary surface 64b and is positioned opposite the fourth connector 62b, as shown in FIG. 7. The fourth connector 62b and the first connector 61a are electrically connected to each other via a conductive path 65 formed in the sealing substrate 64. The conductive path 65 can be formed by a conductive layer, a plated through hole, or the like.

Positioning holes 66 are respectively disposed proximate two diagonally opposing corners of the sealing substrate 64. These positioning holes 66 are positioned to correspond to the positioning pins 76 of the base 12, and each is configured to be inserted into a respective positioning pin 76.

As illustrated in FIGS. 4, 5, and 7, the connector unit 60 is fitted into the fitting recess 70 formed in the bottom wall 12a. That is, the sealing substrate 64 is fitted into the fitting recess 70 so that the first primary surface 64a and the third connector 62a face the bottom wall 12a. Each of the pair of positioning pins 76 is inserted into the a respective positioning hole 66 of the sealing substrate 64. In this way, the horizontal position of the sealing substrate 64 is established with respect to the bottom wall 12a. That is, the positioning pins establish the position of the sealing substrate 64 within a plane that extends from the page in FIG. 7 and passes through sealing substrate 64.

The first primary surface 64a of the sealing substrate 64 is fixed to the installation surface 72 by a sealant 78 and covers the through hole 58 of the base 12. For example, an annular solder sheet (see FIG. 5) can be used as the sealant 78 in some embodiments. In such embodiments, the solder sheet is melted, thereby covering the periphery of the through hole 58 and sealably filling gaps between the first primary surface 64a of the sealing substrate 64 and the installation surface 72. In this way, the sealant 78 fixes the sealing substrate 64 to the installation surface 72, and seals in an airtight fashion the space between the first primary surface 64a and the installation surface 72. Thus, the sealing substrate 64 forms an airtight seal around the periphery of the through hole 58 on the back side of the base 12, thereby sealing the through hole 58 in an airtight fashion.

The fourth connector 62b, which is mounted on the sealing substrate 64, is inserted into the through hole 58 and is exposed to the inside of the base 12 via the through hole 58. That is, the fourth connector 62b is positioned so that another connector can be connected to the fourth connector 62b from the inside of the base 12. The third connector 62a of the board unit 21 (which is disposed in the base 12) is fitted and connected to the fourth connector 62b of the connector unit 60. Together, the third connector 62a and the fourth connector 62b constitute a first two-piece connector 62, i.e., the third connector 62a and the fourth connector 62b are two mating connectors that are configured to mate with each other. In the embodiment, the third connector 62a is a female connector, and the fourth connector 62b is a male connector.

Figure 8:
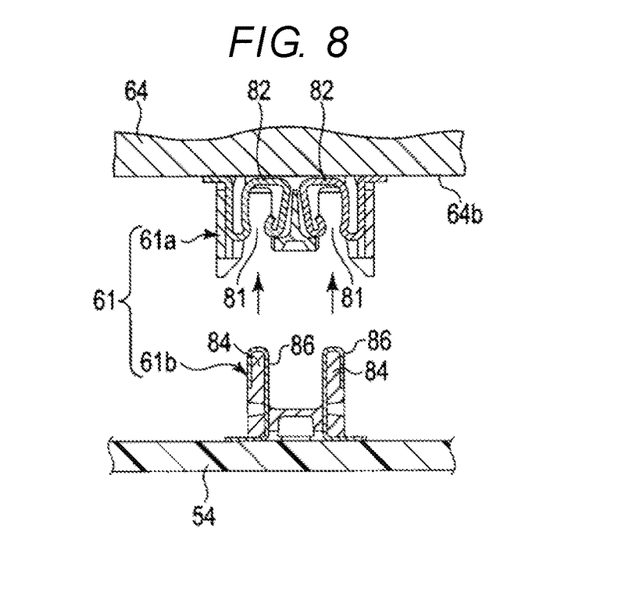

The first connector 61a of the connector unit 60 is exposed on the outer surface (back surface) of the base 12. As illustrated in FIGS. 4, 7, and 8, the control circuit board 54 is disposed substantially opposite and parallel to the back surface of the bottom wall 12a of the base 12. The control circuit board 54 is screwed to the bottom wall 12a by a plurality of screws. The control circuit board 54 is positioned to cover the connector unit 60. A second connector 61b is mounted on the control circuit board 54. The second connector 61b is fitted and connected to the first connector 61a of the connector unit 60. Together, the first connector 61a and the second connector 61b constitute a second two-piece connector 61, i.e., the first connector 61a and the second connector 61b are two mating connectors that are configured to mate with each other.

As illustrated in FIGS. 7 and 8, the first connector 61a mounted on the sealing substrate 64 is a female connector, and the fourth connector 61b mounted on the control circuit board 54 is a male connector. That is, as the female connector, the first connector 61a includes one or a plurality of recesses 81 and a plurality of conductive terminals 82 disposed within the recesses 81. As the male connector, the second connector 61b includes one or a plurality of protrusions 84 and a plurality of conductive terminals 86 disposed on or formed within the protrusions 84. The protrusions 84 are configured to mate with the recesses 81. Thus, as the protrusions 84 are inserted and fitted into the recesses 81 of the first connector 61a, the first connector 61a and the second connector 61b are mechanically connected and fitted to each other. At the same time, the conductive terminals 86 and the conductive terminals 82 come into contact with each other, and the first connector 61a and the second connector 61b are electrically connected to each other.

As illustrated in FIG. 7, which depicts the second connector 61b fitted and connected to the first connector 61a, there is a distance T1 between the control circuit board 54 and the sealing substrate 64. The second two-piece connector 61 fits within the distance T1, and a height of the second two-piece connector 61 is set to 3 mm or less, for example, about 2.5 mm. Similarly, a height of the first two-piece connector 62 (which is configured to fit between the first primary surface 64a of the sealing substrate 64 and the board unit 21) can also be set to, for example, about 2.5 mm.

As described above, the magnetic head 32 and the voice coil of the VCM disposed in the base 12 are electrically connected to the control circuit board 54 disposed outside the housing 10 via the relay FPC, the board unit 21, the third connector 62a, the connector unit 60, and the second connector 61b. Airtightness inside the housing 10 is maintained by the connector unit 60.

According to the HDD of the first embodiment configured as described above, the second two-piece connector 61 is used as a connector for connecting the sealing substrate 64 and the control circuit board 54 to each other. The second two-piece connector 61 is configured with the female connector and the male connector fitted thereinto, consequently the height (in the direction of distance T1) of the connector can be reduced as compared with a compression-type connector. Thus, it is possible to greatly reduce the distance T1 between the control circuit board 54 and the bottom wall 12a of the base. In other words, when the position of the control circuit board 54 is taken as a reference, the bottom wall of the base can be brought closer to the control circuit board 54. Accordingly, the depth of and usable volume within the housing 10 can be enlarged without increasing the outside dimensions of the HDD. As a result, it is possible to install more magnetic disks, for example, nine or more magnetic disks in the housing 10.

In addition, since the second two-piece connector 61 is used as a connector for connecting the sealing substrate 64 and the control circuit board 54 to each other, the pressing force employed in connecting the first connector 61a to the second connector 61b does not act on the control circuit board 54. Thus, deformation and deflection of the control circuit board 54 and the sealing substrate 64 can be avoided. Further, since no external force acts on the sealant 78, sealing reliability can be improved. Furthermore, it is possible to improve connection reliability of electrical connections to the HDD by mounting the female connector of the second two-piece connector 61 on the sealing substrate 64 and mounting the male connector on the side of the control circuit board 54. Specifically, when a load acts on the second two-piece connector 61, the female connector is less likely to be damaged than the male connector. In addition, when the second two-piece connector 61 is damaged and is replaced, the connector on the side of the control circuit board 54 is much easier to exchange than the connector on the side of the sealing substrate. Therefore, the female connector is mounted on the side of the sealing substrate 54 as described above, thereby reducing the potential for damage to and improving the reliability of the second two-piece connector.

In view of the above, according to the first embodiment, a magnetic disk device includes a connector connection portion that can have reduced height while maintaining the airtightness of the magnetic disk device housing.

An HDD according to another embodiment will be described below. In another embodiment described below, the same reference numerals are given to the same components as in the first embodiment described above, and the detailed description thereof is simplified or omitted. The components different from those of the first embodiment will be described in detail.

Second Embodiment

Figure 9:
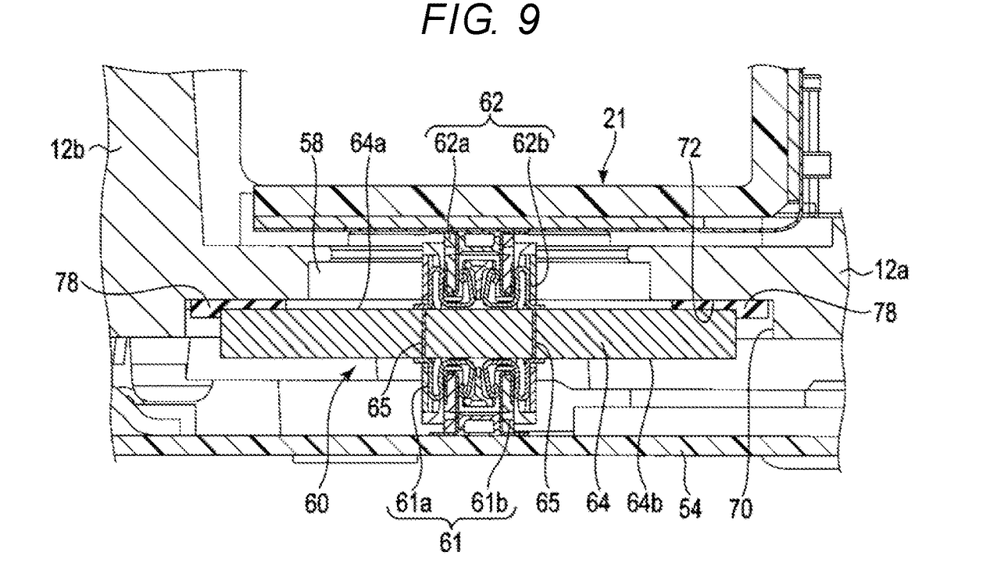
FIG. 9 is a cross-sectional view illustrating a connector mounting portion and a connector unit of a base of an HDD according to a second embodiment.

FIG. 9 is a cross-sectional view illustrating a connector mounting portion of a base and a connector unit in an HDD according to a second embodiment. As illustrated in FIG. 9, a first two-piece connector 62 for connecting a board unit 21 and a sealing substrate 64 includes a third connector 62a mounted on the board unit 21 and a fourth connector 62b mounted on a first primary surface 64a of the sealing substrate 64. According to the second embodiment, the third connector 62a is a male connector, and the fourth connector 62b mounted on the sealing substrate 64 is a female connector.

The female connector is mounted on the side of the sealing substrate 64 in this way, and thus the connection reliability of the connector can be further improved. In view of the above, according to the second embodiment, a magnetic disk device includes a connector connection portion that can have reduced height while maintaining the airtightness of the housing of the magnetic disk device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the sealing substrate is in the form of the multilayer circuit board, but may be formed of another material, for example, glass or ceramic. In the case of using glass or ceramic, the conductive path of the sealing substrate 64 may be configured with a plurality of conductive pins embedded in the sealing substrate 64. The shape, thickness, and formation material of the sealing substrate may be changed or modified in addition to the above embodiments. The number of the positioning pins and the positioning holes described herein is two, but three or more positioning pins and positioning holes may be employed as well.

The connector unit 60 is used for the connection between the board unit inside the housing and the control circuit board outside the housing, but may also be used for electrical connection between other components. Materials, shapes, and sizes of the components of the disk drive can be changed as appropriate. In the disk drive, the number of magnetic disks and magnetic heads can be increased or decreased as necessary, and the size of the magnetic disk can also be varied. The materials, shapes, and sizes of the components of the magnetic disk device are described in the above embodiment, but can be changed as appropriate without exceeding the scope of the disclosure. Helium gas is described as filling the housing, but other gases can be selected as appropriate.

What is claimed is:

1. A disk device comprising:
a housing that includes a base with a through hole formed therein and a cover fixed to the base, wherein the housing contains a gas having a lower density than air;
a magnetic disk and a plurality of magnetic heads within the housing;
a wiring member disposed within the housing that includes conductors that are electrically connected to the heads;
a sealing substrate that is fixed to the base and covers the through hole;
a control circuit board that is disposed outside the housing and adjacent to a back surface of the base;
first mating connectors that are disposed within the housing and connect the sealing substrate and the wiring member; and
second mating connectors that connect the sealing substrate and the control circuit board, wherein
the second mating connectors include a first connector mounted on the sealing substrate and a second connector mounted on the control circuit board, and
the first connector includes first and second recesses and first and second conductive terminals partially covering the first and second recesses, respectively, and the second connector includes first and second protrusions and third and fourth conductive terminals partially covering the first and second protrusions, respectively, and
the first protrusion is inserted into substantially the entire depth of the first recess and the second protrusion is inserted into substantially the entire depth of the second recess to mechanically connect and fit the first and second connectors to each other.

2. A disk device comprising:
a housing that includes a base with a through hole formed therein and a cover fixed to the base, wherein the housing contains a gas having a lower density than air;
a plurality of rotatable magnetic disks that are disposed within the housing;
a plurality of heads that write information on and read information from the magnetic disks;
a wiring member disposed within the housing that includes conductors that are electrically connected to the heads;
a sealing substrate that is fixed to the base and covers the through hole;
a control circuit board that is disposed outside the housing and adjacent to a back surface of the base;
first mating connectors that are disposed within the housing and connect the sealing substrate and the wiring member; and
second mating connectors that connect the sealing substrate and the control circuit board, wherein
the second mating connectors include a first connector mounted on the sealing substrate and a second connector mounted on the control circuit board,
the first connector includes first and second recesses and first and second conductive terminals partially covering the first and second recesses, respectively, and the second connector includes first and second protrusions and third and fourth conductive terminals partially covering the first and second protrusions, respectively, and
the first protrusion is inserted into substantially the entire depth of the first recess and the second protrusion is inserted into substantially the entire depth of the second recess to mechanically connect and fit the first and second connectors to each other.

3. The disk device according to claim 2, wherein the base includes a bottom wall that has the through hole formed therein and an installation surface that is formed on an outer surface of the bottom wall and is disposed around the through hole, and the sealing substrate is fixed to the installation surface with a sealant and seals the through hole in an airtight fashion.

4. The disk device according to claim 3, further comprising a fitting recess that is formed in a region including the through hole, wherein the installation surface is a surface of the fitting recess.

5. The disk device according to claim 4, wherein the fitting recess is formed on the outer surface of the bottom wall.

6. The disk device according to claim 3, wherein the sealant forms an airtight seal around the periphery of the through hole.

7. The disk device according to claim 3, wherein the sealing substrate includes a first primary surface fixed to the installation surface and a second primary surface located on a side of the sealing substrate opposite to the first primary surface, and
the first mating connectors include a fourth connector that is mounted on the first primary surface and is disposed in the through hole and a third connector that is mounted on the wiring member and configured to mate with the fourth connector.

8. The disk device according to claim 7, wherein the first connector is mounted on the second primary surface and is disposed opposite the fourth connector with the sealing substrate interposed therebetween.

9. The disk device according to claim 3, wherein the sealant comprises solder.

10. The disk device according to claim 9, wherein the solder is formed as an annular solder sheet.

11. The disk device according to claim 3, wherein the installation surface is parallel to the sealing substrate.

12. The disk device according to claim 2, wherein the sealing substrate is disposed between the control circuit board and the outer surface of the bottom wall.

13. The disk device according to claim 12, wherein the sealing substrate is disposed in a fitting recess that is formed in a region including the through hole.

14. The disk device according to claim 13, wherein the sealing substrate has a thickness greater than a depth of the fitting recess.

15. The disk device according to claim 13, wherein a distance between a surface of the sealing substrate on a side of the control circuit board and the control circuit board is 3 mm or less.

16. The disk device according to claim 2, wherein the sealing substrate includes a conductive path that electrically connects the first mating connectors to the second mating connectors.

17. The disk device according to claim 16, wherein the conductive path electrically connects the first connector and a fourth connector that is included in the first mating connectors.

* * * * *